United States Patent
Radulescu et al.

(10) Patent No.: US 7,356,669 B2
(45) Date of Patent: Apr. 8, 2008

(54) PROCESSING SYSTEM AND METHOD FOR TRANSMITTING DATA

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 80 days.

(21) Appl. No.: 10/555,403

(22) PCT Filed: May 4, 2004

(86) PCT No.: PCT/IB2004/050571

§ 371 (c)(1),
(2), (4) Date: Nov. 2, 2005

(87) PCT Pub. No.: WO2004/099999

PCT Pub. Date: Nov. 18, 2004

(65) Prior Publication Data

US 2006/0248246 A1    Nov. 2, 2006

(30) Foreign Application Priority Data

May 7, 2003   (EP) .................................. 03101264

(51) Int. Cl.
*G06F 9/54*   (2006.01)

(52) U.S. Cl. ........................................ 712/11

(58) Field of Classification Search .................. 712/11, 712/225, 228
See application file for complete search history.

(56) References Cited

U.S. PATENT DOCUMENTS

| 4,641,276 A | * | 2/1987 | Dunki-Jacobs ............... 710/71 |
| 6,182,183 B1 | * | 1/2001 | Wingard et al. ............ 710/305 |
| 6,330,225 B1 | | 12/2001 | Weber et al. |

FOREIGN PATENT DOCUMENTS

| EP | 0942375 A | 9/1999 |
| WO | 0029961 | 5/2000 |
| WO | 0205144 A1 | 1/2002 |
| WO | 02065700 A2 | 8/2002 |

* cited by examiner

*Primary Examiner*—Eric Coleman

(57) ABSTRACT

A split protocol transmission method for transmitting data and a communication thread identifier for said data along a communication path from a source functional unit (SFU) to a destination functional unit (DFU) via zero or more intermediate functional units (IFU) is described. A data consuming functional unit (CFU) and a data producing functional unit (PFU) in the communication path directly communicate to each other by means of a handshake procedure wherein the data consuming functional unit (CFU) indicates a communication thread identifier (TID) to the data producing functional unit. The data producing functional unit provides data related to said communication thread identifier to said data consuming functional unit. Likewise a data processing system using this method is described.

16 Claims, 2 Drawing Sheets

PROCESSING SYSTEM AND METHOD FOR TRANSMITTING DATA

Figure 1:
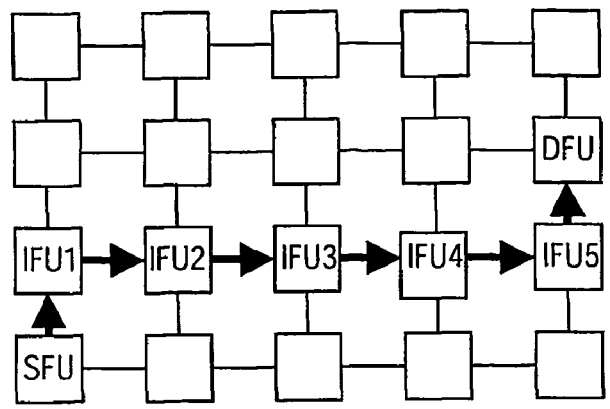

The invention relates to a processing system.

The invention further relates to a method for transmitting data.

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages. The communication network comprises a plurality of partly connected nodes. Messages from a module are redirected by the nodes to one or more other nodes.

A message sent by a source functional unit may comprise a command or a packet of data. It is forwarded via one or more intermediate functional units until it arrives at the destination functional unit. The destination functional unit may on its turn send a message to the source functional unit. A functional unit can be any unit involved in a data stream for example a unit which performs operations on data, such as a CPU, a DSP or a VLIW, or a unit for storing data such as a memory, or a unit for transmitting data such as a router or an interface.

A split protocol is defined as a protocol where transactions are split in a request and a response. After a transmission of a request is completed from a source functional unit to the first intermediate functional in the communication path the source functional unit can proceed with a next transmission, instead of having to wait for a response to that request from the destination functional unit. The destination functional unit will start a separate arbitration procedure if necessary to give a response. A split bus protocol is more efficient when a response generation at the slave takes time. Pipelining allows a master to have multiple outstanding requests (i.e., requests waiting for a response). All transactions within the same communication thread are ordered (responses are delivered in the same order as the requests for that responses where issued by a master). Transactions with different communication threads do not have any ordering constraints.

U.S. Pat. No. 6,182,183 provides a link level protocol for exchanging the message between two subsequent functional units in the communication path from the source functional unit to the destination functional unit. According to the known protocol a master functional unit produces information, e.g. a command (Cmd), an address (Addr), or data (DataReq) and at the same time provides an identification of the thread (ReqThreadID) to which the information belongs. Likewise the slave functional unit may provide information (DataResp), and indicate the communication thread to which it belongs by an identification (RespThreadID).

It is a disadvantage of the known split, pipelined bus protocol that a data consuming functional unit only has limited control over the sequence in which it receives its data. If it has issued requests for data for several communication threads the data producing functional unit determines which of these threads is served first. This may have the consequence that the requested data arrives in an order which does not enable an optimal functioning of the data consuming functional unit.

It is a purpose of the invention to provide an improved link level communication protocol and an improved processing system using such a communication protocol. This purpose is achieved by a method according to the invention as claimed in claim 1, and by a processing system as claimed in claim 9. It is recognized by the inventors that it is in several circumstances advantageous if not the data producing functional unit, but the data consuming functional unit selects the communication thread for which information is exchanged. Hence, in a processing system and method according to the invention on the one hand a split transmission protocol in the communication path is applied. On the other hand for at least one pair of a data consuming and a data producing functional units in the communication path which are communicating with each other the data consuming functional unit has direct control about the communication thread for which it receives data.

One example thereof is a data processing system, wherein the data consuming functional unit is a memory controller. A memory controller a.o. has the function to optimize the scheduling of storing/retrieving information from several communication threads, so that storage and retrieval can take place in a minimum amount of time. A memory controller according to the invention can very efficiently schedule the storage of information, as it can itself select the order of the threads for which it requests information. Alternatively it would be possible to provide the memory controller with large input buffers. This would enable it to receive large amounts of information from several threads and select information from the input buffers in a suitable sequence, but this would go at the cost of a reduced silicon area for other functions.

Another example where it is favorable that the data consuming functional unit can select the process thread is where the data consuming functional unit is a processor arranged for executing a plurality of tasks. Each task switch may require typically several hundreds to a thousand processing cycles. A task switch may typically occur if the processor has insufficient data available for a particular thread. In an embodiment of the invention the multitasking processor is capable of selecting a thread for which it requires data in order to continue with the same thread. In other words the processor schedules tasks taking into account their read data requirements, and indicates this to the data producing functional unit by means of the communication thread identifier.

In this way the frequency of task switches can be reduced

Figure 2:
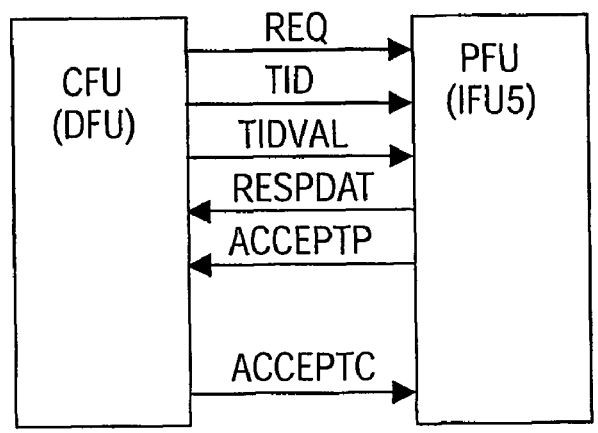
Figure 3:
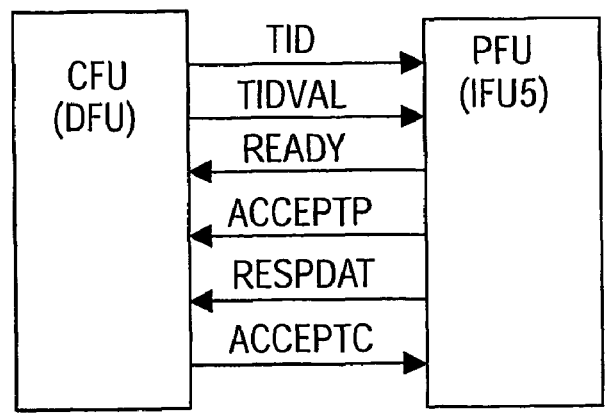
Figure 4:
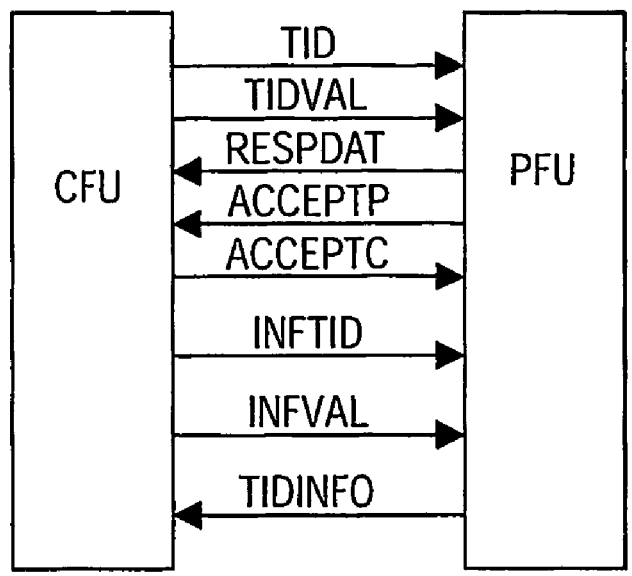
Figure 5:
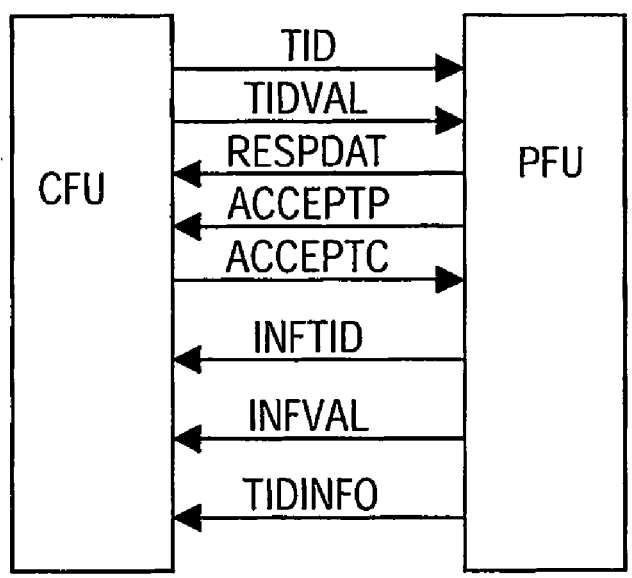

These and other aspects of the invention are described in more detail with reference to the drawing. Therein:

FIG. 1 schematically shows a data processing system,

FIG. 2 schematically shows a pair of a data producing functional unit and a data consuming functional unit in a communication path in the data processing system, according to the invention, FIG. 3 schematically shows a pair of a data producing functional unit and a data consuming functional unit in a second embodiment of the data processing system according to the invention, FIG. 4 schematically shows a pair of a data producing functional unit and a data consuming functional unit in a third embodiment of the data processing system according to the invention, FIG. 5 schematically shows a pair of a data producing functional unit and a data consuming functional unit in a fourth embodiment of the data processing system according to the invention.

FIG. 1 schematically shows a data processing system, which comprises a network connecting a plurality of functional units. The processing system is arranged to transmit data and a communication thread identifier for said data according to a split protocol along a communication path (indicated by arrows) from a source functional unit SFU to a destination functional unit DFU via one or more intermediate functional units IFU1, . . . ,IFU5. By transmitting the data together with a communication thread identifier, multiple unrelated transactions, having mutually different communication thread identifiers can evolve independently.

FIG. 2 schematically shows in more detail a pair of a data consuming functional unit CFU and a data producing functional unit PFU. By way of example the data consuming functional unit CFU and the data producing functional unit PFU respectively are the destination functional unit DFU and the fifth intermediate functional unit IFU5 in FIG. 1.

The data consuming functional unit (CFU) and the data producing functional unit (PFU) in the communication path are arranged to directly communicate to each other by means of a handshake procedure. Therein the data consuming functional unit PFU issues a request for data REQ and indicates a communication thread identifier TID identifying for which communication thread it requests the data .It explicitly indicates validness of the TID with a signal TIDVAL. Alternatively validity of the request REQ and the communication thread identifier TID can be indicated by a particular value of one of these signals REQ, TID. If the data producing functional unit PFU has the data for the requested communication thread available it responds by indicating acceptance with the signal ACCEPTP and providing the requested data RESPDAT. In another embodiment the data producing functional unit accepts the request in a fixed number of clock cycles. A separate signal for indicating acceptance is then superfluous.

On its turn the data consuming functional unit CFU indicates acceptance of the data by a signal ACCEPTC. In another embodiment, where the data consuming functional unit always accepts the data within a fixed number of clock cycles a separate accept signal need not be generated by the data consuming functional unit.

FIG. 3 shows an extended protocol. The protocol is initiated in the same way by the data consuming functional unit CFU, which provides an indication for a communication thread identifier TID and indicates that it is valid explicitly by a signal TIDVAL, or implicitly by reserving a particular value of the TID signal to indicate that it does not represent a valid communication thread. In this example the data consuming functional unit CFU can only issue requests for reading data by providing a particular communication thread identifier. In case that it is desired that the data consuming functional unit CFU can also issue other commands, one or more additional request identification signals can be added to specify the command type.

Contrary to the embodiment shown in FIG. 2 the data producing functional unit PFU additionally can request the CFU to indicate an other communication thread identifier TID for which it wants to receive data. For that purpose the PFU provides a first and a second output signal ACCEPTP, READY which in a preferred embodiment have the following meaning:

| READY | ACCEPTP | Meaning |
| --- | --- | --- |
| 0 | * | The data consuming functional unit CFU has to continue indicating the communication thread identifier TID. |
| 1 | 0 | The second functional unit (CFU) is requested to indicate another communication thread identifier. |
| 1 | 1 | The indicated communication thread identifier (TID) is accepted. |

Issuing an acknowledge may take a number of cycles, in which time the READY signal is kept low (0). During that time the value of the signal ACCEPTP is not of importance (*). When the PFU is ready, READY is raised (1), and on the signal ACCEPTP indicates if the transaction has been accepted (1) or not (0). If a transaction is delayed (ACCEPTP=0), it is possible to switch to another communication thread.

In the embodiment of FIG. 3 there is one additional signal that encodes whether a link-level data exchange can proceed or whether it is delayed. With only one additional signal, there is only a proceed/delay feedback possible. This can be generalized to encode more elaborate feedback on why a transaction cannot proceed on a communication thread (when there are multiple causes possible: e.g., empty/full buffers, a process not expecting data on a communication thread is running on a CPU, etc), or how long transactions can proceed on a communication thread (e.g., there is enough buffering/data to proceed with at least N transactions on a communication thread).

Still further embodiments of the invention are illustrated with reference to FIGS. 4 and 5. Therein the transmission method includes a further handshake procedure wherein information is exchanged from the data producing functioning unit (PFU) to the data consuming functional unit (CFU) to exchange communication thread information. The further handshake procedure is independent of the handshake procedure in which data is exchanged. In FIGS. 4 and 5 the signals TID, TIDVAL, RESPDAT, ACCEPTP and ACCEPTC have the meaning as described with reference to FIG. 2. These signals form part of a first handshake procedure for exchanging data for a particular communication thread indicated by the data consuming functional unit CFU. The communication thread information provided by the data producing functional unit PFU can be used by a scheduler in the CFU to schedule better the sequence of communication threads for which it requests data. The information can for example be the amount of data available for that communication thread or the expected time interval whereafter new data will become available.

In the embodiment of FIG. 4 the further handshake procedure includes an information request signal INFTID controlled by the data consuming functional unit CFU. This signal indicates a particular communication thread for which the data consuming functional unit indicates additional information. The data consuming functional unit CFU signals validity of the information request signal INFTID by a signal INFVAL. In a fixed number of clock cycles the data producing functional unit PFU provides the information TIDINFO relating to the specified communication thread. Instead of providing the information TIDINFO after a fixed number of clock cycles, it can be provided in a variable time interval if the data producing functional unit PFU provides a signal indicating the validity of this information. In the embodiment of FIG. 4 the consumer functional unit CFU polls for information with the PFU independently of the transfer of data because that takes place in an independent handshake (TID, TIDVAL, RESPDAT, ACCEPTP, ACCEPTC).

FIG. 5 shows an embodiment wherein the PFU controls the transfer of communication thread information in the further handshake procedure. The PFU indicates a communication thread about which it has information with signal INFTID) and provides the information with the signal TIDINFO. Validity of these signals is indicated with the signal INFVAL. The PFU may provide the information about all communication threads at each handshake, but independently of the transfer of data because that takes place in an independent handshake (TID, TIDVAL, RESPDAT, ACCEPTP, ACCEPTC). Alternatively it may provide that information for one communication thread at a time. In a preferred embodiment only information is provided if the status of a communication thread has changed.

It is remarked that the scope of protection of the invention is not restricted to the embodiments described herein. It is noted that information, e.g. data for a communication thread, information about a communication thread, can be exchanged between the processing units in several ways, e.g. serial, parallel or in a combination of ways.

Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. Split protocol transmission method for transmitting data and a communication thread identifier for said data along a communication path from a source functional unit (SFU) to a destination functional unit (DFU), the method comprising:
   directly communicating in the communication path between a data consuming functional unit (CFU) and a data producing functional unit (PFU) by means of a handshake procedure;
   providing a communication thread identifier (TID) from the data consuming functional unit (CFU) to the data producing functional unit;
   providing data related to said communication thread identifier from the data producing functional unit to said data consuming functional unit when the data producing functional unit (PFU) accepts the communication thread identifier; and
   providing another communication thread identifier from the data consuming functional unit (CFU) to the data producing functional unit (PFU) when the data producing functional unit (PFU) does not accept the communication thread identifier, the another communication thread identifier being provided in response to a request from the data producing functional unit (PFU).

2. Method according to claim 1, further comprising providing a separate signal (TIDVAL) from the data consuming functional unit (CFU) to the data producing functional unit (PFU) to indicate that the communication thread identifier is valid.

3. Method according to claim 1, wherein the data producing functional unit (PFU) accepts the communication thread identifier within a fixed number of clock cycles.

4. Method according to claim 1, wherein the data consuming functional unit (CFU) indicates (ACCEPTC) when it has accepted the data from the data producing functional unit (PFU).

5. Method according to claim 1, wherein the data consuming functional unit (CFU) accepts the data from the data producing functional unit (PFU) within a fixed number of clock cycles.

6. Method according to claim 2, wherein the data producing functional unit (PFU) provides information indicating that the data consuming functional unit (CFU) has to continue indicating the communication thread identifier (TID).

7. Method according to claim 1, characterized by a further handshake procedure wherein information is exchanged from the data producing functioning unit (PFU) to the data consuming functional unit (CFU) to exchange communication thread information, the further handshake procedure being independent of the handshake procedure defined in claim 1.

8. The method according to claim 2, wherein the data producing functional unit (PFU) provides a thread acceptation signal (ACCEPTP) when it has accepted the indication for the communication thread (TID), and defers providing data until after it has provided the thread acceptation signal.

9. Processing system comprising a plurality of functional units, the processing system being arranged to transmit data and a communication thread identifier for said data according to a split protocol along a communication path from a source functional unit (SFU) to a destination functional unit (DFU), a data consuming functional unit (CFU) and a data producing functional unit (PFU) in the communication path being arranged to directly communicate to each other by means of a handshake procedure, wherein the data consuming functional unit (CFU) indicates a communication thread identifier (TID) to the data producing functional unit and the data producing functional unit provides data related to said communication thread identifier to said data consuming functional unit, wherein the data consuming functional unit (CFU) provides another communication thread identifier to the data producing functional unit (PFU) when the data producing functional unit (PFU) does not accept the communication thread identifier, and wherein the another communication thread identifier is provided in response to a request from the data producing functional unit (PFU).

10. Processing system according to claim 9, wherein the data consuming functional unit is an application specific processor (ASP) capable of scheduling tasks based on incoming read data.

11. Processing system according to claim 9, wherein the data consuming functional unit is a memory controller comprising a scheduler for providing indications of a communication thread identifier in an order which reduces memory access time.

12. Method according to claim 1, wherein the data producing functional unit (PFU) accepts the communication thread identifier within a fixed number of clock cycles without issuing an acceptance signal (ACCEPTP) to indicate an acceptance of the communication thread identifier.

13. Method according to claim 1, wherein the data consuming functional unit (CFU) accepts the data from the data producing functional unit (PFU) within a fixed number of clock cycles without issuing an acceptance signal (ACCEPTC) to indicate an acceptance of the data.

14. Processing system according to claim 9, wherein the data consuming functional unit (CFU) provides a separate signal (TIDVAL) to the data producing functional unit (PFU) to indicate that the communication thread identifier is valid.

15. Processing system according to claim 9, wherein the data producing functional unit (PFU) accepts the communication thread identifier within a fixed number of clock cycles without issuing an acceptance signal (ACCEPTP) to indicate an acceptance of the communication thread identifier.

16. Processing system according to claim 9, wherein the data consuming functional unit (CFU) accepts the data from the data producing functional unit (PFU) within a fixed number of clock cycles without issuing an acceptance signal (ACCEPTO) to indicate an acceptance of the data.

* * * * *